United States Patent
Durbha et al.

(10) Patent No.: US 8,839,376 B2
(45) Date of Patent: Sep. 16, 2014

(54) APPLICATION AUTHORIZATION FOR VIDEO SERVICES

(75) Inventors: Seetharama Rao V. Durbha, Louisville, CO (US); Stuart Hoggan, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 140 days.

(21) Appl. No.: 13/538,630

(22) Filed: Jun. 29, 2012

(65) Prior Publication Data
US 2014/0007198 A1    Jan. 2, 2014

(51) Int. Cl.
*G06F 15/16*    (2006.01)

(52) U.S. Cl.
USPC ............ 726/4; 726/2; 726/9; 726/10; 726/17; 726/21; 713/171

(58) Field of Classification Search
USPC .................... 726/2, 4, 9–10, 17, 21; 713/171
See application file for complete search history.

(56) References Cited

U.S. PATENT DOCUMENTS

| | | | |
|---|---|---|---|
| 7,900,247 B2 * | 3/2011 | Chong | 726/10 |
| 2005/0130585 A1 * | 6/2005 | Gnuschke et al. | 455/3.06 |
| 2011/0179477 A1 * | 7/2011 | Starnes et al. | 726/9 |

\* cited by examiner

*Primary Examiner* — Thanhnga B Truong
(74) *Attorney, Agent, or Firm* — Great Lakes Intellectual Property, PLLC.

(57) ABSTRACT

Authorizing an application to access web services or other electronic services is contemplated. Authorization of application may include requiring the application to successfully obtain an appToken and a userToken. The appToken may be provided by an application administrator to attest to an authenticity or level of trust with the application. The userToken may be issued by an identity provider (IdP) attest to an authenticity or level of trust with a user of the application. A service provider sourcing the services may analyze the appToken and userToken to determine content available to application.

14 Claims, 5 Drawing Sheets

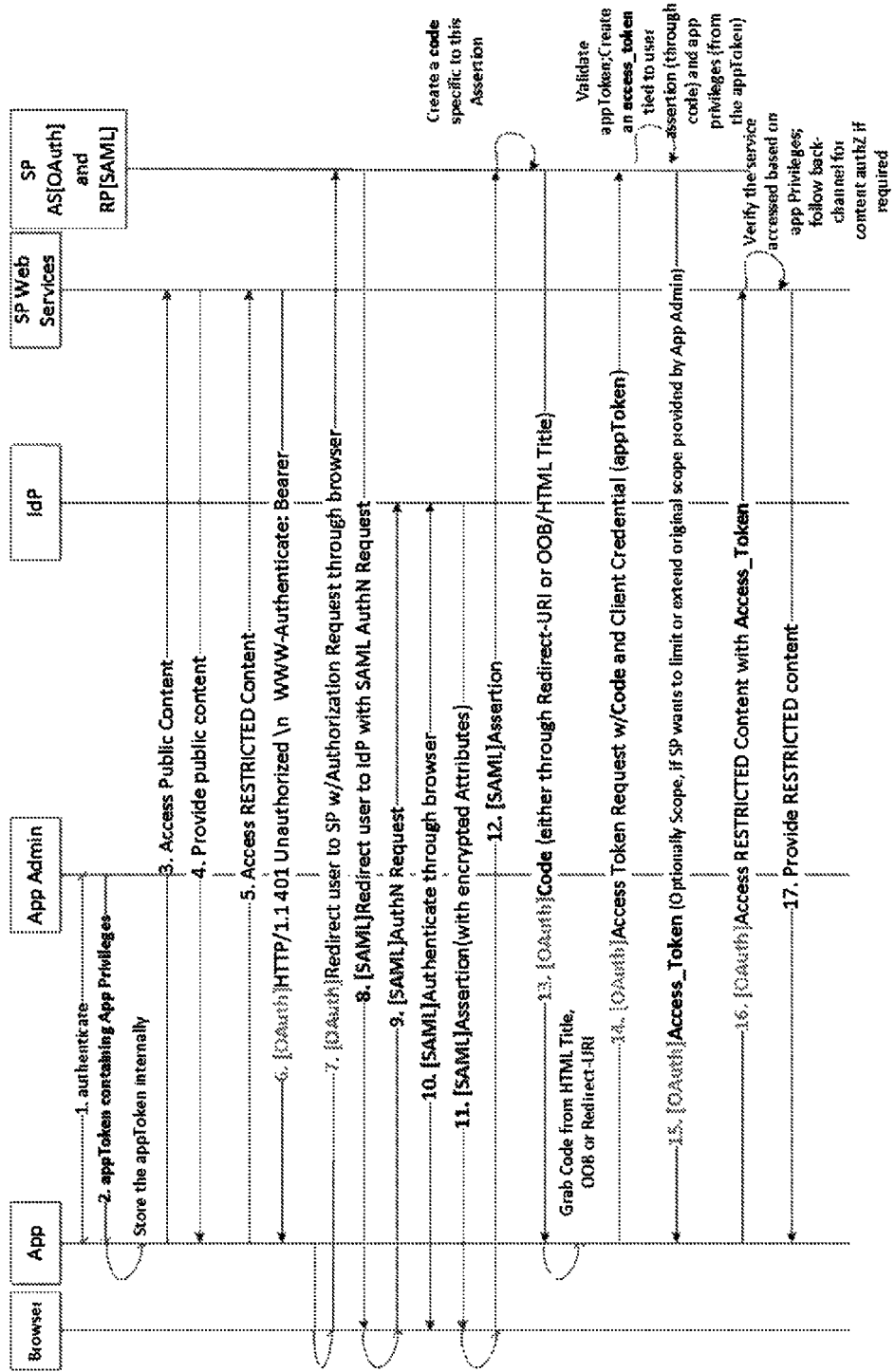

US 8,839,376 B2

APPLICATION AUTHORIZATION FOR VIDEO SERVICES

TECHNICAL FIELD

The present invention relates to authorizing applications for access to video services, such as but not necessarily limited to authorizing applications issued by independent developers to access video services.

BACKGROUND

Applications on mobile devices may be used to access video services, such as but not necessary limited to web-based video services where video signals are delivered over a data network from a service provider. The service provider may desire a mechanism to validate that the application requesting the content is trusted or otherwise entitled to access the video services. This capability may be particularly beneficial when the application requesting video services is non-proprietary to the service provider, e.g., provided by an independent application developer as opposed to being a proprietary application issued by the service provider. In addition to authenticating the application to access video services, the service provider may desire a mechanism to authenticate a corresponding user. Some service providers provided different tiers of services, generally corresponding with different subscription purchases such that trusted authentication of the user may be desired in order to limit access to subscriber-specific content.

BRIEF DESCRIPTION OF THE DRAWINGS

FIG. 5 illustrates a messaging diagram for user authentication having certain processes adapted from an API in accordance with the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
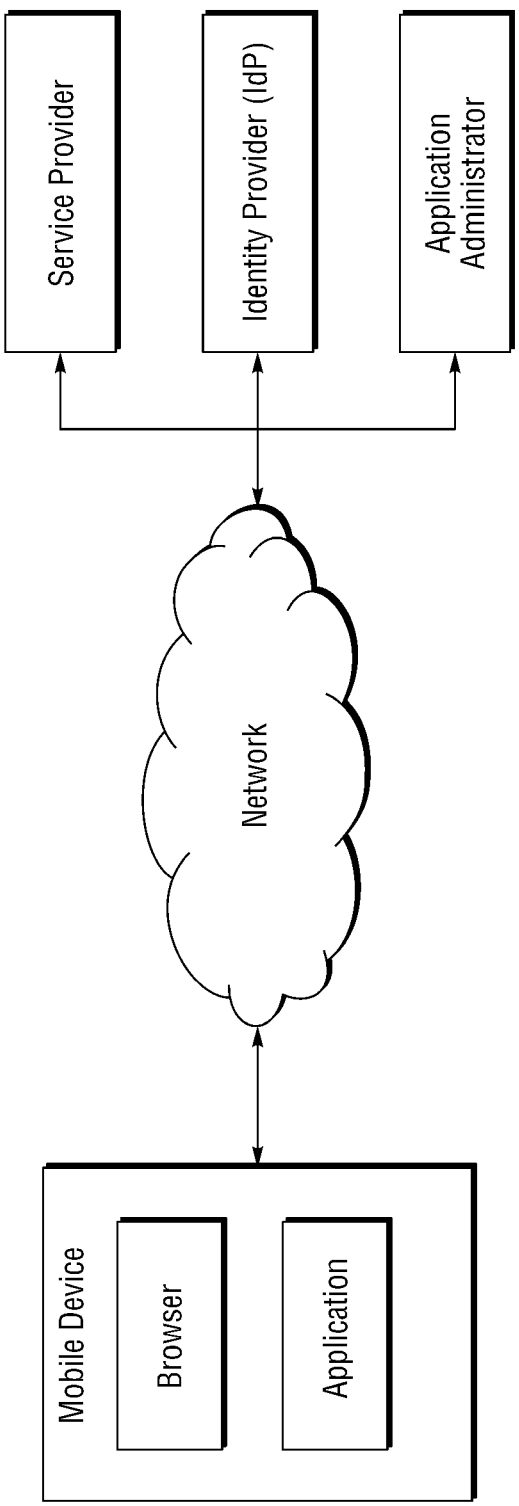
FIG. 1 illustrates an application authorization system as contemplated by one non-limiting aspect of the present invention.

FIG. 1 illustrates an application authorization system as contemplated by one non-limiting aspect of the present invention. The system may be configured to facilitate authorizing a mobile device to access video services or other services associated with a service provider. The contemplated authorization process may include a multiple-part authorization process where both of an application and a user associated with the accessing mobile device are authenticated. This multiple-part authorization is predominately described with respect to facilitating access to video services; however, the present invention fully contemplates its use and application in facilitating authorization for any type of service where it may be beneficial to authenticate the accessing device as well as the accessing user. The present invention is also predominately described with respect to the accessing device being a mobile device but this is also done for exemplary non-limiting purposes as the present invention fully contemplates its use and application in facilitating access authorization for any type of device having capabilities to operate an application associated with accessing the desired services.

The mobile device may be any type of device having capabilities sufficient to facilitate operation of the application. The mobile device, for example, may be a mobile phone, a cellular phone, a computer, a tablet, a set top box (STB), a media terminal adapter (MTA), a router, a gateway, a network address translator (NAT) or other device configured to facilitate signaling between the service provider and the mobile device. The service provider may be associated with any type of electronic service provider, including a Multi-channel Video Programming Distributor (MVPD), a cable television service provider, a broadcast television service provider, a satellite television service provider, a data service provider, an Internet service provider (ISP), a cellular telephone service provider, a multiple system operator (MSO) or other entity having capabilities which provide subscription or non-subscription-based services. A network may be included facilitate signaling between the mobile device and the service provider. The network may correspond with any combination of wireline and/or wireless networking element, which may be dependent on the type of infrastructure relied upon by the service provider to facilitate delivery of the video services or other services desiring authentication present invention.

The authentication process contemplated by the present invention may be facilitated with an identity provider (IdP) and an application administrator. The IdP may be configured to facilitate identifying users/subscribers associated with the mobile device (the present invention fully contemplates facilitating authorization of multiple mobile devices at the same time). The IdP may be configured to track information, privileges, entitlements, assertions and other information associated with a plurality of users. This information may be incorporated in accordance with the present invention to facilitate authenticating users. The user authentication may be coupled with an application authentication provided by the application administrator. The application administrator may be configured to facilitate authorizing applications developed by independent entities for use in facilitating access to the video services. Application administrator may be configured to facilitate authentication of the application prior to installing the application on the browser, such as by a third party application developer submitting the application for testing to the application administrator.

The mobile device is shown to include the application operating in cooperation with a browser. The browser may be a web browser or other browser having capabilities sufficient to facilitate accessing websites or other information carried over the Internet. This exemplary configuration is provided without necessarily intending to limit scope and contemplation of the present invention. It is provided to demonstrate one use of the present invention to facilitate delivery of video services over the Internet or through other web-based mechanisms for access by a third-party application included on the mobile device. This scenario is believed to be particularly relevant to television service providers (e.g., cable, satellite, high-speed data, and cellular providers) that wish to extend their services beyond proprietary systems and infrastructures to support access over broader platforms and/or with applications generated by independent developers, particularly when such access is facilitated with using mobile devices like tablets or mobile phones. The capabilities of the present invention may be particularly beneficial in extending the video experience from pure TV watching to a dual experience where users are able to access video and/or to control video services through a secondary device, such as in the manner described in U.S. patent application Ser. No. 13/458,276, the disclosure of which is hereby incorporated by reference in its entirety.

Figure 2:
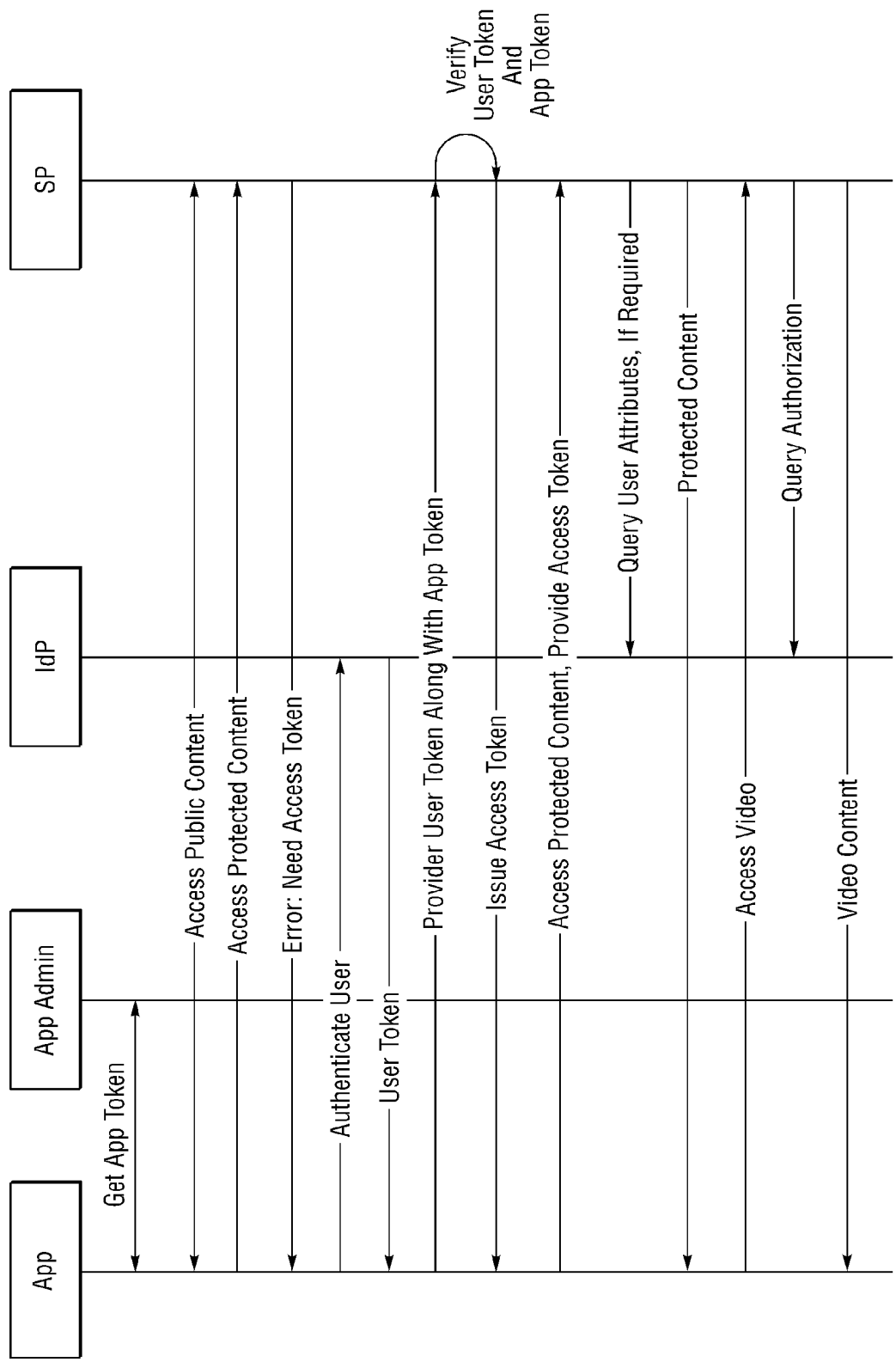
FIG. 2 illustrates a message diagram as contemplated by one non-limiting aspect of the present invention.

FIG. 2 illustrates a message diagram associated with a method of facilitating application authorization for video services as contemplated by one non-limiting aspect of the present invention. The authorization process may be achieved with one or more of the devices shown in FIG. 1 being configured to facilitate controlling or direction operations or processes of one or more of the other illustrated devices or other non-illustrated devices disclosed herein. One or more of the devices may include a non-transitory computer-readable medium associated having computer-readable code embodied therein for controlling the devices to electronically facilitate the contemplated authorization process. The following tables provide additional details regarding the nomenclature, assumptions, requirements and references used herein for non-limiting purposes to express the scope and contemplation of the present invention, none of which are necessarily limiting or absolutely demanded in order to practice the present invention.

| Entities | |
|---|---|
| Role | Definition |
| MVPD | Multi-channel Video Programming Distributor - like Comcast, Time-Warner, etc. |
| Programmer | Programme developer - typically a channel owner - like HBO, StarZ, etc. |
| $3^{rd}$ Party | As used in this document, $3^{rd}$ party refers to an application developer that is neither an MVPD nor a Programmer |
| Consortium | A group of MVPDs, Programmers, or a combination. A consortium may be created to consolidate some functionality common across the participants. |
| CDN | Content Delivery Network - used by either MVPDs or Programmers to distribute their content. |
| Subscriber | An individual who is a paid subscriber to video content. |
| User | Synonym for Subscriber. |

| Terms | |
|---|---|
| Role | Definition |
| Application | Software that can be installed on mobile device. |
| App | An abbreviation for Application |
| App ID | A unique identifier given to each App. This is opaque except to App and the App Admin. |
| Client | Client is analogous to Application (note that Client is an OAuth terminology). Also note that client is NOT the user/subscriber. |
| Inner App | Particularly MVPD applications may 'host' other applications within the context of the MVPD application. The inner applications are not distinct applications from a platform perspective (not installed separately), but are HTML fragments (pulled by the MVPD app) that display Programmer specific content to the user, and will use MVPD provided interfaces to access web services provided by the MVPD. For the sake of this document, inner apps are treated as an implementation detail. |
| Account | A key to the subscriber data at the MVPD. There can be multiple Subscribers belonging to the same account. A particular subscriber may be designated as the actual owner. |

| Roles | | |
|---|---|---|
| Role | Definition | Can be played by |
| Application Developer | Applications are developed by an entity called Application Developer. | $3^{rd}$ party, MVPD, Programmer |
| Application Admin | Applications need to be regulated - definitely, the services exposed by MVPDs and Programmers are expected to be consumed by pre-registered entities, possibly with business agreements in place. The 'Application Admin' would be that regulator. The responsibilities include<br>1. Issuing Identities (and credentials) to Application Developers<br>2. Managing the life-cycle of application identities<br>3. Managing the privileges/authorizations provided to each application<br>4. Run-time: Validating application's credentials and issuing tokens | MVPD, Consortium |
| IdP | Identity Provider - an entity that authenticates users/subscribers. This entity has subscriber's account information and credentials. It can validate/authenticate the user. This entity manages user's account life-cycle. | MVPD |

Roles -continued

| Role | Definition | Can be played by |
|---|---|---|
| SP | Service Provider - an entity that exposes certain services that can be used by the application. And MVPD or a Programmer could be a Service Provider. | MVPD, Programmer |
| CP | Content Provider - an entity that actually streams a video content to the subscriber's device. | MVPD, Programmer, CDN |
| Router | An entity that consolidates functionality across multiple entities. It may support standard interfaces for the application to access, whereas use proprietary interfaces on the members side. Note that a rower may seem like an App Admin, IdP, SP or CP to the application. In that sense, a Router is treated as 'invisible' in this document. | MVPD, Programmer Consortium |

Assumptions

| Role | Definition |
|---|---|
| Application Developer | Applications can be developed by any one - MVPD, Programmer, 3$^{rd}$ Party |
| Web Services | Applications interact with the MVPD or Programmer primarily using Web Services. More accurately, they use HTTP based interfaces. |
| Each App interacts with one Programmer | Each application may interact with only one Programmer [This is not a constraint, per se, but more an observation.] |
| Trust relationships | Trust relationships between different entities are required in this document. But how those trust relationships are formed is outside the scope of this document. |

| Req # | High Level Requirement | Description |
|---|---|---|
| App.1 | App Authentication | All applications must be authenticated |
| App.2 | App Authorization | Applications must be associated with privileges, and the service providers must have a way to verify the privileges belonging to an application. |
| User.1 | User Authentication | Users must be authenticated using MVPD provided IdP. |
| User.2 | No MVPD Application necessary | User Authentication must not depend on the availability of an MVPD provided application on the device. |
| User.3 | Username/password based authentication | Applications must support username/password based authentication to verify user's credentials. |
| User.4 | SSO across applitations | Solution should support Single sign-on across multiple applications that the user may be using on the same device. |
| User.5 | Logout | Solution must support user logout. |
| AuthZ.1 | Content access authorization | CPs/SPs must authorize the specific content (by the MVPD) before it is played for the user. |
| Gen.1 | No browser | Solution must support at least one way for applications running on devices that do not have browsers. |
| Gen.2 | Standards | Use well-known standards where applicable. |
| Gen.3 | Existing infrastructure | Preference should be given to utilize existing infrastructure as much as possible. |

Assumptions
The architecture presented here makes the following assumptions.

| # | Area | Description |
|---|---|---|
| 1 | App | Applications can make HTTPS connections, particularly with server certificate validation. |
| 2 | | Applications have the capability to hold (embedded) credentials securely. Credentials could be private keys, shared secrets, or other. |
| 3 | | Applications are capable of performing crypto operations like encryption/decryption/signatures, with minimum strengths identified in this document. |
| 4 | | Applications can process JSON (though not necessarily XML). |
| 5 | | Applications have access to (secure) local storage that allows them to store some (dynamic) data. |
| 6 | | If provided by the environment, applications can display browser within the context of the application (like WebView on iOS). |
| 7 | | Applications understand the (pre-published) privileges. |

The architecture contemplated by the present invention may be based on the concept of a token. A token may be defined as a set of claims about a specific entity, signed by an issuing entity, the signature of which can be verified by a relying party (who has pre-established trust with the issuing entity). It may be assumed (by the relying party) that the issuing entity has performed adequate authentication of the specific entity before issuing the token to it.

Token={Set of Claims}+{Signature of the issuer}

The set of claims may be further defined to include the following information mandatorily Set of Claims=Issuer, Issue Timestamp, Expiry Timestamp, Subject, Audience (optional)

They are defined in the below table.

| Role | Definition |
|---|---|
| Issuer | The universally unique Identifier for the entity that issues the token. This specification does not define the format for this identifier, but it is assumed that all participants in the eco-system have a way to communicate their respective identities to other (and related trust mechanisms) through some mechanism. Such mechanisms are outside of the scope of this document. |
| Issue Timestamp | The time at which the toke is issued. This is required to be UTC time. The actual value is the number of milliseconds from the epoch. |
| Expiry timestamp | The time at which the token expires. This is required to be UTC time. The actual value is the number of milliseconds from the epoch. |
| Subject | The universally unique identifier of the entity to which this token is issued. Again, the format used for achieving universal uniqueness is not defined in this document. |
| Audience (Optional) | The universall unique idnentifier of the entity to whom this token is addressed. This can be used to specifically constrain the token usage. |

The present invention contemplates the use of various protocols and formats to facilitate message and other operations attendant to facilitating the contemplated processes, including but not limited to [AUTH1.0] Authentication and Authorization Interface. 1.0 Specification, CL-SP-AUTH1.0-I03-120118, Jan. 18, 2012, Cable Television Laboratories, Inc.; [ID-BearerTokens] IETF Internet Draft, The OAuth 2.0 Authorization Protocol: Bearer Tokens, M. Jones, D. Hardt, and D. Recordon, draft-ietf-oauth-v2-bearer-15.txt, December 2011; [ID-JWT] IETF Internet Draft, JSON Web Token (JWT), M. Jones, D. Balfanz, J. Bradley, Y. Goland, J. Panzer, N. Sakimura, P. Tarjan, draft-jones-json-web-token-07.txt, December 2011; [ID-OAuth Assertions] IETF Internet Draft, OAuth 2.0 Assertion Profile, M. Jones, B. Campbell, Y. Goland, draftietf-oauth-assertions-01, October 2011; [ID-OAuth] IETF Internet Draft, The OAuth 2.0 Authorization Protocol, E.H-Lahav, D. Recordon, D. Hardt, draft-ietf-oauth-v2-22.txt, September 2011; [SAML Bindings] OASIS Standard, Bindings for the OASIS Security Assertion Markup Language (SAML) v2.0, March 2005; [SAML Core] OASIS Standard, Assertions and Protocols for the OASIS Security Assertion Markup Language (SAML) v2.0, March 2005; OAuth; Security Assertion Markup Language (SAML), JavaScript Object Notation (JSON); Bearer Tokens; Online Content Access (OLCA); the disclosures of which are hereby incorporated by reference in their entirety.

The protocols may be used to facilitate generating assertion, tokens, privileges and various messages types for use in executing the contemplated application authorization. The following token names may be used with the present invention.

| Token Name | Definition | Issued By | Intended Audience |
|---|---|---|---|
| appToken | A token issued to an application by the Application Administrator, mostly as a result of a successful authentication of the application credentials. This token may also include privileges (in terms of which class of web services it can access). The format of this token is standardized in this specification. | App Admin | SP, IdP |
| userToken | A token issued as a result of successful user/subscriber authentication. This token is issued by the IdP, and could be delivered to the App or the SP. The format of this token is standardized in this specification. | IdP | SP, App |
| accessToken | An OAuth access token. See [ID-OAuth]. The format of this token is NOT standardized in this specification. This token is opaque to the client, and meaningful only to the SP. | SP [AS]* | SP [WS]* |
| contentToken | A token issued by the SP to verify that a request for a particular content is an authorized request. This token is issued by an SP and targeted for a CP. The format of this token is standardized in this specification. | SP | CP |

The message diagram illustrated in FIG. 2 illustrates use of the noted tokens in facilitating the application authorization processes contemplated by one non-limiting aspect of the present invention. This application authorization process may include:

1. App knows the App Admin to which it needs to authenticate.
2. App authenticates itself (with the embedded 'secret', previously issued by App Admin as a result of successful registration, or some other technique prescribed by App Admin).

3. App Admin issues an 'appToken' to the App that proves that the App is a legitimate app. The appToken may contain claims belonging to the app, including the privileges (see below).

4. SP may provide some content as public content—no tokens needed to access that type of content.

5. When App tries to access a protected content, SP will respond with an error that requires an accessToken.

6. App follows procedures outlined in this document to obtain an access token.

7. App presents that accessToken on all further requests.

8. SP may query the IdP for any subscriber attributes.

9. SP will grant access to the protected content.

10. For actual content access (playing a video), SP will perform an authorization with the IdP. On approval, SP may either stream the content itself, or redirect to a CP—giving a contentToken that proves to the CP that this is an authorized request.

App uses end points provided by different entities for various purposes—accessing content, authenticating the user, etc. It is up to the developer to get such information either statically (at the time of packaging the application), or discover dynamically. The architecture proposed here relies on the ability of entities consuming the tokens to be able to validate their authenticity (through the signature included in the token). It is up to the deployments to identify which entities they would trust and obtain the credentials from those entities.

One goal of the App Admin is to manage App's credentials and tokens. Additionally, it may also administer privileges provided to Apps. The semantics of such privileges need to be pre-established between the App Admin and the SP (or IdP in some use cases). The present invention may include use of the following: (1) privileges be pre-defined, e.g., a privilege could be to schedule a VOD recording, change a channel, buy VOD content, etc.; (2) give a name to each privilege; (3) publish those names (and semantics) to the SPs/IdPs; (4) access is binary—either an application has a particular privilege, or not; (5) privileges be included in the appToken, i.e., when the SP receives the appToken, it can see what it is allowed to do. While the present invention contemplates defining the privileges, their definitions may also be left to the App Admins.

As noted above, the present invention contemplates: (a) construction of the tokens; (b) protocol to request for a token and respond with a token, and/or (c) protocol to use those tokens while requesting a resource. This architecture is based on the concept of a token. A token is defined as a set of claims about a specific entity, signed by an issuing entity, the signature of which can be verified by a relying party (who has pre-established trust with the issuing entity). It is assumed (by the relying party) that the issuing entity has performed adequate authentication of the specific entity before issuing the token to it.

Token={Set of Claims}+{Signature of the issuer}

The set of claims is further defined to include the following information

Set of Claims=Issuer, Issue Timestamp, Expiry Timestamp, Subject, Audience (optional)

These fields are defined in the table below.

| Field | Definition |
| --- | --- |
| Issuer (Mandatory) | The universally unique Identifier for the entity that issues the token. This specification does not define the format for this identifier, but it is assumed that all participants in the eco-system have a way to communicate their respective identities to other (and related trust mechanisms) through some mechanism. Such mechanisms are outside of the scope of this document. |
| Issue Timestamp (Mandatory) | The time at which the token is issued. This is required to be UTC time. The actual value is the number of milliseconds from the epoch. |
| Expiry timestamp (Mandatory) | The time at which the token expires. This is required to be UTC time. The actual value is the number of milliseconds from the epoch. |
| Subject (Mandatory) | The universally unique identifier of the entity to which this token is issued. Again, the format used for achieving universal uniqueness is not defined in this document. |
| Audience (Optional) | The universal unique identifier of the entity to whom this token is addressed. This can be used to specifically constrain the token usage. |

The OAuth prescribes optional protocols that may be used in accordance with the present invention to initiate user authentication and to obtain authorizations for accessing user's resources on a resource server. It defines the bindings to use and parameters to communicate the tokens. There are fundamental differences between OAuth entities and the entities in TV Everywhere (TVE), the disclosure of which is hereby incorporated by reference in its entirety. In OAuth, it is the user who 'allows' access to 'their' content to an application. In TVE, it is the MVPD (through the IdP role) that 'allows' access to a resource for a specific user (at a specific time). Also, OAuth explicitly does not define the token formats. In TVE, the notion of user's identity (however opaque) is important to SPs so that they can perform personalizations. Also, OAuth does not define how to perform application (client) authentication, the standard does not include bindings to include application tokens. OAuth, though, has one important advantage—defining interfaces that are simpler, piggyback on HTTP protocol and do not explicitly require XML processing on the App side. Given the advantages, and disadvantages, of OAuth, the present invention contemplates adapting OAuth to facilitate one or more of the process and/or operations associated with facilitating the contemplated application authorization processes.

In particular, one non-limiting aspect of the present invention contemplates melding SAML based user authentication, back-channel content authorization between the SP and IdP, and OAuth for App communication with IdP/SP/CP. The following table defines an optional mapping between OAuth roles TVE roles.

| OAuth Role | Maps to | TVE Role |
| --- | --- | --- |
| Client | → | App |
| User Agent [UA] | → | Browser (either stand-alone browser or through WebView kind of browser) |
| Resource Owner [RO] | → | Subscriber<br>Note that this mapping is limited to specific protocol to initiate user authentication. Resource Server/SP still performs a back-channel authorization with MVPD for every content access. |
| Authorization Server [AS] | → | An implementation at Service Provider (Again, this mapping is made for protocol purposes, not to mean that Service Provider acts like the Authorization Server for the actual content access. MVPD still provides the content authorization through back channel.) The objective here is to let the SP create the Access Tokens. This makes sense as the SP is the consumer of Access Tokens, and having the SP create the Access Tokens enables flexibility on how the SP defines/creates/manages these Access Tokens. |
| Resource Server [RS] | → | Service Provider/Content Provider |

Figure 3:
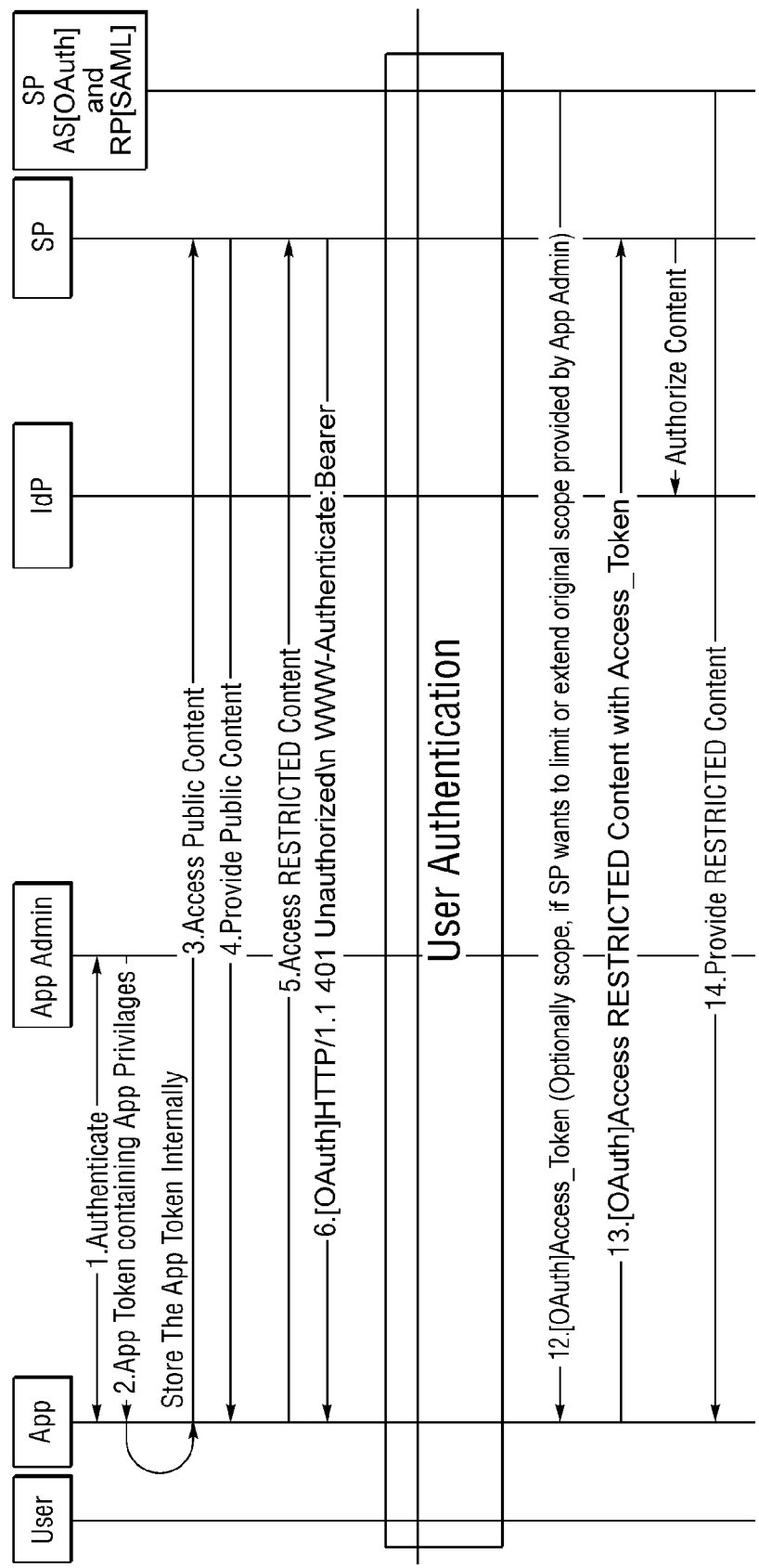
FIG. 3 illustrates a messaging diagram associated with adapting OAuth in accordance with the present invention.
Figure 4:
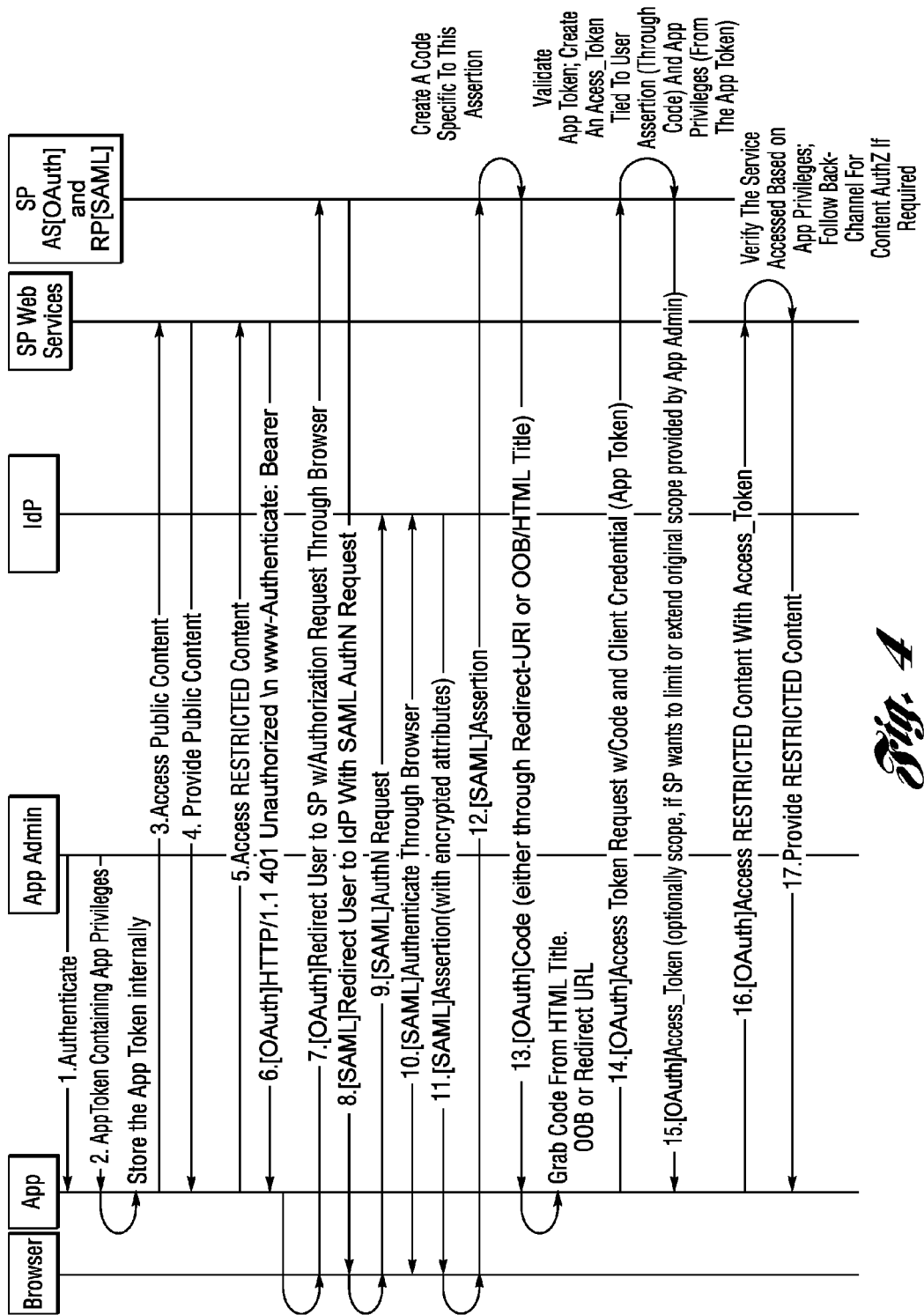
FIG. 4 illustrates a messaging diagram for user authentication having certain process adapted from SAML in accordance with the present invention.

FIG. 3 illustrates a messaging diagram associated with adapting OAuth according to the present invention, including its use in facilitating privileges belonging to the App. The diagram references use of the OAuth protocol with the prefix of [OAuth] but how an OAuth Access Token is requested is not shown. Rather, the issuance of an OAuth access toke may depend on how the user authentication happens. For user authentication, which may include the following two forms: (1) SAML Protocol—requires browser; and (2) Custom API (to validate a given username/password)—does not require browser FIG. 4 illustrates a messaging diagram for user authentication having certain process adapted from SAML, which are noted with a prefixed [SAML], as contemplated by one non-limiting aspect of the present invention. FIG. 5 illustrates a messaging diagram for user authentication having certain process adapted from an API specific, which are prefixed with [Custom API], as contemplated by one non-limiting aspect of the present invention. The following highlights some of the tenets of one or both of the architectures show in FIGS. 4 and 5:

1. App is approved by a specific App Admin—each App knows how to contact their App Admin. Application also knows how to authenticate itself to App Admin.

2. App Admin issues an appToken upon successful authentication by the App. The appToken is standardized according to the present invention. The appToken is signed by the App Admin according to the present invention. Any one that has a trust relationship with the App Admin will be able to verify this token. However, SPs are especially called out as requiring this trust relationship.

3. appTokens MAY include privileges belonging to the App.

4. SPs may expose services that do not require any App or User authentication.

5. SPs are gateway to the content—thus they need to ensure that the App to which they are providing the content is an authorized App. Beyond App verification, SPs may need to continue user based Authorization checks at the time of content access. Thus, SPs may need two types of tokens to deliver any content—appToken and userToken.

6. SPs may need user information for: a. Back-channel authorization with the Authorization Providers; b. Personalization, or any other value added services they want to provide; and c. Presentation of content based on user attributes 7. The present invention contemplates use of OLCA Authorization protocols to perform back-channel authorization checks and/or attribute queries.

8. OAuth protocols may be used between the App and SP. In this specification, SPs act like both an Authorization Server and Resource Server. A typical OAuth based flow may include: a. App accesses a service that is protected; b. SP responds with an OAuth error message (based on Section 2.4 of [Bearer Tokens]); c. Based on Section 4.1 of [OAuth], App 'redirects' the user to (SP's) Authorization Server with an OAuth Authorization Request—App may use either an external browser or WebView kind of browser; d. SP needs to authenticate the user—it creates a SAML AuthNRequest and redirects the user agent to IdP. IdP authenticates the user and redirects the user back to SP's Authorization Server with a SAML Assertion; e. When SP's Authorization Server receives the SAML Assertion, it extracts the user information, creates (an Authorization) code and redirects the user back to App's redirection URL with that code; f. App obtains the code and contacts (SP's) Authorization Server with the code and appToken for an accessToken; and g. (SP's) Authorization Server validates the signature on the appToken, extracts the privileges (scope) and creates an accessToken and sends it back to the App where Authorization Server may change the scope for this access token (from what is specified in the appToken—either increase or decrease) such that the response to App also contains the new Scope.

9. If a custom API is desired instead of the above described SAML flow, for user authentication, then the way App gets the Access Token may be based on OAuth Assertion Profile [OAuth Assertions]. This may include: a. App obtains the username and password from the user directly and calls a custom API provided by the IdP; b. the present invention defines the custom API; c. App sends its appToken on the custom API, along with the SP's entity ID; d. IdP validates the appToken, and verifies the UN/PW combination such that, if valid, IdP creates a userToken and sends it back to the App—the userToken could be SAML Assertions based or JWT based; e. App sends that token to SP's OAuth Authorization server's token end point (along with appToken)—based on section 4.2 of [OAuth Assertions]; f. SP's OAuth Authorization Server validates the userToken AND appToken, and responds with the Access Token, which the SP may enhance or diminish the privileges it wants to give the App, in which case it also includes a scope parameter in the Access Token response.

10. Apps will use the Access Token from then on for any requests they make to that SP. Since SPs have an associated appToken and userToken for each Access Token, they can verify if an App is allowed to invoke the service in context, and/or if the user from the userToken has access to the data/ content being requested. The Accessing Protected Resources section of [ID-OAuth] discusses how to send the Access Token on service requests. This specification uses the Bearer tokens, specifically using the Authorization header, as detailed in the Authorization Request Header Field section of [ID-BearerTokens].

The application authorization processes contemplated by the present invention and illustrated in FIGS. 2-5 includes issuing an appToken for an application requesting authentication. This may include issuing the appToken as part of an application authentication process. The application authentication may predominately occur between the App and the App Admin. There are may be two distinct steps: (1) Application uses a protocol specified by the App Admin to prove its credentials; and (2) App Admin creates an appToken and delivers that to the App. The present invention contemplates proving the credentials but does not specifically define the process. Also, the URL (or any form of address) to contact App Admin is contemplated but not specifically defined. The present invention contemplates but does not define the specific protocol by which the App Admin delivers the appToken to the App. The present invention does include a definition for the format for the appToken.

An appToken may be defined a JSON style object having the following schema/attributes.

```
/* [M} stands for a mandatory field, [O] stands for an
   optional field */
{
[M] "tokenFormat" : "Format of the attached token - either SAML or
JWT",
[M] "tokenContent" : "Actual token - either in the JWT format or in
SAML format",
[O] "expires" : "in Milliseconds from epoch", /*Note this is for the
sake of the App */
[O] "scope" : ["Privilege-1", "Privilege-2"] /* Note this is for the sake
of the app, same information may be repeated inside of actual token. */
}
```

The tokenFormat is provided to allow a multitude of token formats—like SAML and JWT. In future, this invention can be used to include other types of tokens that are as yet unknown. The tokenContent is the actual token. The expires allows the client (receiving the token) to know when the token expires. This is included here so that the client application need not look into the actua tokenContent (and thus having to understand various token formats). The scope may also be included outside of the actual token so that the client application is aware what actions it is allowed to perform, without having to understand the actual token format.

Valid tokenFormats may include:

1. urn:cablelabs:app:1.0:token:format:JWT, or
2. urn:cablelabs:app:1.0:token:format:SAML The present invention contemplates use of the JWT Compact Serialization (section 9.1 in [JWT]). Per the specification, a JWT token has the following segments: (1) Header segment, (2) Payload segment, and (3) Crypto segment. The segments may be separated by a period ".". Header and crypto segments MUST be per [JWT]. The JWT payload may include the following schema.

```
{
[M] "iss": "App Admin Entity ID",
[M] "urn:cablelabs:app:1.0:token:issueTime" : "Issued time in
milliseconds",
[M] "exp" : "Expires time in milliseconds",
[M] "urn:cablelabs:app:1.0:token:type" : "urn:cablelabs:1.0:jwt:token-
type:appToken",
[M] "urn:cablelabs:app:1.0:token:subject" : "App ID, that the App
also knows",
[O] "urn:cablelabs:app:1.0::privileges" : ["Privilege-1", "Privilege-2"]
}
```

The App Admin may include "iss", "urn:cablelabs:app: 1.0:token:issueTime", "exp", "urn:cablelabs:app:1.0:token: type", and "urn:cablelabs:app:1.0:token:subject" attributes in the appToken payload. App Admin may include "urn: cablelabs:app:1.0::privileges" in the appToken payload.

A description of the fields is given in the table below.

| Field | Description |
| --- | --- |
| "iss" | Entity ID of the issuing App Admin. This entity ID is a globally unique identifier. "iss" MUST be in a valid URI format. (Note that this specification does not define how uniqueness is achieved, it is up to the App Admins.) It is important to notice that this ID is going to be treated as a key into the trust relationship that the receiver of this token has about this entity. Thus, this ID must relate to a trust relationship. |
| "urn:cablelabs:app:1.0:token:issueTime" | The time this token is created/issued, in UTC time zone. The value is the number of milliseconds from January 1, 1970 00:00:00 UTC. |
| "exp" | The time this token expires, in UTC time zone. The value is the number of milliseconds from January 1, 1970 00:00:00 UTC. |
| "urn:cablelabs:app:1.0:token:type" | Indicates the type of token. For appTokens, the value MUST be "urn:cablelabs:app:1.0:token-type:appToken". |
| "urn:cablelabs:app:1.0:token:subject" | Application ID. This is the unique identifier given to this application by this App Admin. This ID uniquely identifies the application to which this token is issued. The entity receiving this token may or may not know this ID. It is beyond the scope of this document how the App Admin may communicate the Application ID to other entities in the eco-system. |
| "urn:cablelabs:app:1.0::privileges" | A (JSON) array of privileges belonging to this application (granted by the App Admin). See Section 6.12 below for the semantics of App Privileges. |

The app admin entity ID may be used to identify an entity issuing the appToken. This ID may be useful by the SP or other entity processing the appToken to select an appropriate signature for use in authenticating authenticity of the appToken, i.e., the authenticity of the issuer of the appToken. The issue time may be useful in cooperation with the expires time for entity receiving appToken to identify whether the appToken is still valid. The app admin may desire to place time constraints or other limitations on how long the appToken is valid in order to force be authentication or to otherwise continuously checked authenticity of their issued appTokens. The type may be used to identify the appToken from the contemplated userToken. The subject may be used to identify the application to which the appToken is relevant. The device rely upon the appToken facilitate access to content use the subject as a key to access its database. The privileges may be used to identify activities permitted of the application, e.g., one privilege may be used to indicate authenticity of the application to facilitate channel changes but not to facilitate a DVR recording.

A SAML tokenContent may be formed of the following syntax (per Section 3.4.4.1 of SAML 2.0 Bindings document). The tokenContent is formed of the following syntax (per the "Deflate Encoding section of [SAML Bindings]):

SAMLResponse=value&SigAlg=value&Signature=value

The whole string may be URL-encoded, as ampersands and equal signs here will collide with ampersands when this token is being transmitted as part of a URL. App Admin may include SAMLResponse, SigAlg, and Signature fields. App Admin may create the values for SAMLResponse, SigAlg, and Signature fields as per Section 3.4.4.1 of

[SAML Bindings]. The SAML Assertion may have the Subject NameID as the AppID. The SAML Assertion may have an AuthenticationStatement. The SAML assertion may have an AttributeStatement consisting of (at least) the following attribute:

urn:cablelabs:1.0:jwt:claim-name:privileges

That attribute can have multiple values—one for each privilege that the application has.

That attribute can have multiple values—one for each privilege that the application has.

The goal of the App Admin is to manage App's credentials and tokens. Additionally, it may also administer privileges provided to Apps. The semantics of such privileges may need to be pre-established between the App Admin and the SP (and IdP in some use cases). This specification recommends the following:

1. Privileges be pre-defined (privileges could be "schedule a VOD recording", "change a channel", "buy VOD content", etc.).
2. Give a name to each privilege.
3. Publish those names (and semantics) to the SPs/IdPs.
4. Access is binary—either an application has a particular privilege, or not.
5. Privileges be included in the appToken. This way, when the SP receives the appToken, it can see what it is allowed to do.

This specification does not define the privileges themselves; they are determined by the App Admins/SPs.

Applications may be expected to store the appToken internally. They may have access to the expires and will scope parameters in the appToken JSON structure. Apps may use these values to intelligently decide when to get a new token and whether they can perform certain actions or not. The App can expect an error message if it uses an expired token, or invokes a service to which it is not privileged.

Once provisioned with the appToken, the application may desire access to content of the service provider. The service provider may grant the application access to public content and require receipt of an accessToken prior to granting access to private or protected content. In response to receipt of a request to access public content, the service provider may immediately grant access. In the event the request is for protected content, the service provider may respond with an error message indicating that the application requires the corresponding accessToken. The process of providing the accessToken to the application may begin with a user authentication process. The user authentication process may correspond with application performing an exchange with the IdP intended to establish a level of trust with the associated user. Upon successful completion of the authentication process, a userToken may be provided to the application. The userToken may then be used in cooperation with the appToken to assess whether the application should be provided with the accessToken necessary to access the requested content.

Prior to issuance of the userToken, the SPs may respond with a 401 code (as described in the WWW-Authenticate Response Header Field section of [IDBearerTokens] when they receive request for a service that requires an Access Token. The actual response may correspond with step 6 of FIGS. 4 and 5 and may look like the following:

HTTP/1.1 401 Unauthorized
    WWW-Authenticate: Bearer realm="<<Realm Name>>"

Error Codes and Expected Behavior for specific error codes to use for various conditions are shown below.

| Error Code | Meaning | Expected Behavior/Notes |
| --- | --- | --- |
| invalid_token | SP could not understand or parse the token. | This may require further investigation on the developer and SP sides. |
| expired_token | Access token expired. | App must obtain a new accessToken. If SP had given a refreshToken earlier, it may use that to obtain a new accessToken.
If not, for API based user authentication. App may try an accessToken request with previous userToken and appToken. For SAML based user authentication. App should start with a new Authorization Request (that triggers user authentication). |
| expired_user_token | User must be re-authenticated. | App must initiate a new user authentication flow. |
| expired_app_token | App token expired. | App must contact its App Admin to get a new appToken. After that. App needs to get a new accessToken based on this appToken. For API-based user authentication, it may use an existing userToken to make an accessToken request. For SAML-based user authentication. App must start with a new Authorization request (that triggers user authentication). |

-continued

| Error Code | Meaning | Expected Behavior/Notes |
| --- | --- | --- |
| insufficient_scope | App does not have privileges associated with the service requested by it. | Typically, this results in an error message to the user, indicating to them that they cannot perform that action (through this App).<br>However, it is possible that the App privileges have changed at the App Admin. Thus, the App may try getting a new appToken, and seeing in the privileges field if there is any change from its earlier appToken. If so, it may try getting a new accessToken based an this new appToken and try the request again. |
| not_authorized | User is not authorized for this operation/request. | App must show corresponding error message to the user. If there is a user message in the response, App must show it to the user as wall. |

When App receives a 401 asking for a bearer token, it should trigger a process to obtain an accessToken. A typical [ID-OAuth] flow is used to obtain the accessToken. This includes performing user authentication, obtaining a code as a result of successful user authentication, and presenting the code along with client credentials (appToken) to obtain the accessToken. The following description cover these steps.

Step 7 of FIG. 4 may include the App creating an OAuth Authorization Request and redirects the user through a browser (internal or external) to the (SP's) Authorization Server. How the App obtains the Authorization Server's URL is outside the scope of this document.

The App may adhere to the "Authorization Request" section in [ID-OAuth] for the authorization request. In addition, the following rules may apply:

1. client_id may be App ID (must match "urn:cablelabs:app:1.0:token:subject" in appToken)
2. scope may not be included. Authorization Servers can ignore scope if it is included.
3. redirect_uri may be included.

Steps 8-12 of FIG. 4 may include, upon receiving the Authorization Request; the SP's AS may generate a SAML Authentication Request and redirect the user agent (browser) to IdP. The SP may ask the user to select their IdP before redirecting the user. (An SP may also employ techniques to auto-detect the IdP.)

The SP may generate SAML AuthNRequest and redirection procedures according to [AUTH1.0].

The IdP may perform user authentication, generate a SAML Assertion and redirect the user's browser back to SP. The IdP may meet the requirements in [AUTH1.0] for the generated SAML Assertion and redirection to SP. Additionally, it may be recommended that any attributes included in the Assertion be encrypted (in accordance with [AUTH1.0]), to prevent the App from reading the attributes from the Assertion.

Step 13 of FIG. 4 may include, after receiving an assertion for successful authentication, the Authorization Server extracting the necessary user information from the assertion and creates a code keyed to that information. It redirects the user agent back to App with the code. The AS may adhere to the Authorization Response subsection of the Authorization Code section in [ID-OAuth]. Note that the URL to which the AS redirects with the code is the redirect_uri given in the Authorization Request [Step 7]. It is up to the App implementation to be able to receive or intercept this redirect.

All implementations may adhere to the Error Respohse section of [ID-OAuth]. In addition to the error codes identified, the following error codes are permitted.

| Error Code | Meaning |
| --- | --- |
| invalid_user | User authentication failed. |
| user_not_authorized | User is not authorized for this SP's content. |

The AS may include error_description and error_uri in the response. If they are included, the App may show them to the user.

Step 14 of FIG. 4 may include, in response the code received in the Authorization Response [Step 13], App contacting SP's AS for an accessToken. This may be an OAuth Access Token request. The AppToken may be included in parameters called client_assertion_type and client_assertion.

From the appToken, the value of the "tokenFormat" may be sent in a parameter called client_assertion_type, and the value of the "tokenContent" may be sent in a parameter called client_assertion. See the Transportation Assertions and Client Authentication sections in [ID-OAuth Assertions].

Step 15 of FIG. 4 may include SP's AS validating the appToken signature and verify that the code in the request was given to this App. SP's AS will then create an accessToken, tied to data about the user from the SAML Assertion, and data about the App from the appToken. It may be essential that the AS does this binding between the accessToken and data from Assertion and appToken, as when the accessToken is used for subsequent resource access, SP can determine if that request is authorized or not.

The AS may adhere to the Access Token Response and Successful Response sections of [ID-OAuth] for the access token response. In addition, the following rule may apply.

"scope" parameter may be present in the response JSON structure.

If "scope" parameter is present, App may use that as guidance for what privileges it has at this particular SP, rather than the global privilege set it obtained from the App Admin through appToken.

Step 7 of FIG. 5 may include the App obtaining username and password of the subscriber through its own user interface (UI). IdP provides a web service (over secure channel) that allows the App to validate the entered username and password. It is expected that the IdP would provide this validation service only to trusted applications—thus, the App needs to provide its appToken in the request. The corresponding request API may include the following signature.

URI - custom
Content-type: application/x-www-form-urlencoded;charset=UTF-8
Allowed HTTP POST Parameters: username, password, client_assertion_type, client_assertion, spEntityID
Cookies from previous authentication The related HTTP parameters are shown in the table below.

| Parameter | Requirement Type | Description |
| --- | --- | --- |
| username | Mandatory | Username entered by the user |
| password | Mandatory | Password entered by the user |
| client_assertion_type | Mandatory | Value of parameter "tokenFormat" from the appToken |
| client_assertion | Mandatory | Value of parameter "tokenContent" from the appToken |
| spEntityID | Optional | Target SP Entity ID, IdPs may entertain a request without a specific target SP. |

The related response may include the IdP validating request and optionally tiding errors in the request, either relating to the request itself or with the given combination of username and password. If no errors are present, IdP creates a 'userToken' and includes it in the response. The response has the following JSON signature.

```
{
[M] "tokenFormat": "Valid values are JWT, and SAML",
[M] "tokenContent" : "Actual token, either in SAML or JWT format"
}
```

The JWT payload schema is shown below. IdP may create the userToken in the following format.

```
{
    [M] "iss": "IdP Entity ID",
    [M] "urn:cablelabs:app:1.0:token:issueTime" : "Issued time in milliseconds from January 1, 19700:00hrs in UTC",
    [M] "exp" : "Expires time in milliseconds from January 1, 1970 00:00hrs in UTC",
    [M] "urn:cablelabs:app:1.0:token:type" : "urn:cablelabs:app:1.0:token-type:userToken",
    [M] "urn:cablelabs:app:1.0:token:subject" : "Subject NameID that the IdP wants to send to this SP. This must be compatible with a Subject NameID the IdP would have sent in a SAML Assertion. SP MUST use this for back-channel authorization requests.",
    [M] "urn:cablelabs:app:1.0:token:subject-format" : "Transient OR Persistent. See [SAML Core] for interpretation by IdP or SP.",
    [O] "urn:cablelabs:olca:1.0:attribute:authz:channelID" : "Channel ID",
    [O] "urn:cablelabs:olca:1.0:attribute:authz:maxMPAA" : "maximum MPAA rating for this user",
    [O] "urn:cablelabs:olca:1.0:attribute:authz:maxVCHIP" : "maximum VCHIP rating for this user"
}
```

The IdP entity ID may be used to identify an entity issuing the userToken. This ID may be useful by the SP or other entity processing the userToken to select an appropriate signature for use in authenticating authenticity of the userToken, i.e., the authenticity of the issuer of the userToken. The issue time may be useful in cooperation with the expires time for entity receiving userToken to identify whether the userToken is still valid. The IdP may desire to place time constraints or other limitations on how long the userToken is valid in order to force be authentication or to otherwise continuously checked authenticity of their issued userTokens. The type may be used to identify the appToken from the contemplated userToken. The subject may be used to identify the application to which the userToken is relevant. The subject-format may be used to indicate whether the userToken is to remain active persistently or transiently i.e., whether the same userToken will be used in the future whether the userToken may be periodically changed. As the corresponding with determining whether the IdP issues same userToken to the same used repeatedly whether a new userToken is issued to the user over time. The channel ID may be used to indicate channels associated with the user's subscription to which users intended to access content. The maxMPAA may indicate moving ratings which the user is authorized to access. The maxVCHIP may be used to indicate television ratings of the television programs was user is authorized to access The IdP may generate a SAML Assertion according to [AUTH1.0].

An error response from IdP may follow the following JSON structure in the event the userToken is unacceptable or insufficient to support access to the desired, private content. The HTTP status code MUST be 401.

```
{
[M] "error" : "Error code",
[O] "userMessage" : "Optional error message, to be displayed to the user"
}
```

The following error codes are acceptable.

| Error Code | Interpretation |
| --- | --- |
| spID_missing | SP Entity ID must be given |
| spID_invalid | IdP did not recognize the given SP Entity ID |
| unPW_invalid | Given username and password combination is invalid |
| client_invalid | Given appToken is not recognized by IdP |
| client_expired | Given appToken expired |

Step 9 of Figure may include, after obtaining a userToken from the IdP, the App then contacting (SP's) Authorization Server for AccessToken. The related implementations may adhere to section 4.2 of [ID-OAuth Assertions]. In addition, following rules apply:

1. The grant_type MUST be either JWT or SAML.
2. The assertion MUST be the value of tokenContent.
3. Request MUST contain client_assertion and client_assertion_type (per the Using Assertions as Authorization Grants section of [ID-OAuth Assertions] and as described in Access Token Request [Step 14].

Apps use the accessToken for any requests they make to that SP. Since SPs have an associated appToken and userToken for each accessToken, they can verify if that App is allowed to invoke the service in context, and/or if the user from the userToken has access to the data/content being requested. The related Accessing Protected Resources section in [ID-OAuth] discusses how to send the Access Token on service requests. This specification uses the Bearer tokens, specifically using the Authorization header, as detailed in the Authorization Request Header Field section of [ID-BearerTokens]. The corresponding implementations may adhere to the Authorization Request Header Field and the WWW-Authenticate Response Header Field sections of [IDBearerTokens]. An example is shown below.

```
GET /resource HTTP/1.1
    Host: sp.programmer.com
    Authorization: Bearer <<AccessToken>>
```

In response, if the given accessToken is valid, SP will respond with the functional data for the service requested. Based on the access code, SPs are expected to be able to retrieve the associated user and App tokens (or the data in those tokens). SPs are expected to perform authorization checks for the requested content with the MVPDs, as well as make sure that the privileges belonging to the App allow this particular request. If there are any errors found, SP may respond with a HTTP 401 error and MUST include an error parameter that identifies what is wrong with the request (see Error Conditions below). SP may also include a user_message. Apps MUST show the contents of user_message to users. An example is shown below.

```
HTTP/1.1 401 Unauthorized
    WWW-Authenticate: Bearer realm="<<Realm Name>>"
            error="invalid_token",
            user_message="Optional description"
```

The following error conditions may be noted by the SP or other entity processing the accessToken in the event the accessToken is unverified (which are summarized in a table above).

1. Unrecognized token: error="invalid_token"
2. Expired access token: error="expired_token"
3. Expired userToken: error="expired_user_token"
4. Expired appToken: error="expired_app_token"
5. App not privileged for this web services call: error="insufficient_scope"
6. User not authorized: error="not_authorized". If any user_message is present in the response, then App may show it to the user.

As supported above, one non-limiting aspect of the present invention contemplates facilitating application authorization. The authorization may include the following:

1. User 'discovers' an application, downloads, and installs it.
2. User starts the application. Application may provide some initial content without any user authentication.
3. At some point, the service provider may require that the application can only be accessed from an authorized application. At that point, the application contacts the 'Application Admin', obtains an application token, and presents it to the service provider. This document defines the interfaces for fetching and passing the application token, and the format for the application token.
4. Service providers may also want to know what privileges an application carries so that they can be certain that a particular service can be provided to a particular application. This specification defines how the Application Admin can pass application's privileges in the application token.
5. At some other point, service provider may require the user be authenticated to access particular content/service. At that point, the application will use the flows defined in this specification to authenticate the user and pass the result of the authentication to service provider. This specification defines how the user can be authenticated at an MVPD by the application and how the result of that can be communicated to the service provider.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of authorizing an application in a device to access web services comprising:
   receiving an appToken from the application in the device;
   receiving a userToken from the application in the device;
   determining whether the appToken and the userToken are one of verified and unverified;
   in the event either one of the appToken and the userToken are unverified, denying authorization for the application to access the web services;
   in the event both of the appToken and the userToken are verified, issuing the application in the device an accessToken;
   authorizing the application in the device to access the web services in response to receipt of the accessToken from the application;
   the appToken being issued to the application as part of application authentication process conducted with an application administrator; and
   the appToken being issued with the following schema:
   "token Format": "Format of the attached token—either SAML or JWT",
   "tokenContent": "Actual token—either in the JWT format or in SAML format",
   "expires": "in Milliseconds from epoch",
   "scope": ["Privilege-1", "Privilege-2"].

2. The method of claim 1 further comprising the application authentication process including formatting the appToken to include the following attributes:
   "iss": "App Admin Entity ID",
   "token:issueTime": "Issued time in milliseconds",
   "exp": "Expires time in milliseconds",
   "token:type": "urn:cablelabs: 1.0:jwt:token-type:appToken",
   "token:subject": "App ID, that the App also knows",
   "1.0::privileges": ["Privilege-1", "Privilege-2"].

3. A method of authorizing an application in a device to access web services comprising:
   receiving an appToken from the application in the device;
   receiving a userToken from the application in the device;
   determining whether the appToken and the userToken are one of verified and unverified;
   in the event either one of the appToken and the userToken are unverified, denying authorization for the application to access the web services;
   in the event both of the appToken and the userToken are verified, issuing the application in the device an accessToken;
   authorizing the application to access the web services in response to receipt of the accessToken from the application in the device;
   the appToken being issued to the application as part of application authentication process conducted with an application administrator; and
   the application authentication process including formatting the appToken to include the following attributes:

SAMLResponse=value&SigAlg=value&Signature=value.

4. A method of authorizing an application in a device to access web services comprising:
   receiving an appToken from the application in the device;

receiving a userToken from the application in the device;
determining whether the appToken and the userToken are one of verified and unverified;
in the event either one of the appToken and the userToken are unverified, denying authorization for the application to access the web services;
in the event both of the appToken and the userToken are verified, issuing the application in the device an accessToken;
authorizing the application to access the web services in response to receipt of the accessToken from the application in the device;
the userToken being issued to the application as part of a user authentication process conducted with an identity provider (IdP); and
the user authentication process including formatting the userToken to in include the following attributes:
"iss": "IdP Entity ID",
"token:issueTime . . . Issued time in milliseconds from Jan. 1, 1970 0:00 hrs in UTC",
"exp . . . Expires time in milliseconds from Jan. 1, 1970 00:00 hrs in UTC",
"token:type": "app:1. 0:token-type:userToken",
"token:subject":"Subject NameID that the IdP wants to send to this SP,
"token:subject-format": "Transient OR Persistent,
"attribute:authz:channelID": "Channel ID",
"attribute:authz:maxMPAA":"maximum MPAA rating for this user",
"attribute:authz:maxVCHIP":"maximum VCHIP rating for this user.

5. The method of claim 1 further comprising issuing an error code if either one of the appToken and userToken is unverified.

6. A method of authorizing an application operating on a mobile device to access television services of a service provider, the method comprising:
receiving an appToken for the application from the mobile device;
receiving a userToken for a user of the mobile device;
determining whether the appToken and the userToken are one of verified and unverified;
in the event both of the appToken and the userToken are verified, issuing the application an accessToken sufficient for the application to access the television services;
the appToken being issued to the application as part of application authentication process conducted with an application administrator;
the appToken being issued with the following schema:
"token Format": "Format of the attached token—either SAML or JWT",
"tokenContent": "Actual token—either in the JWT format or in SAML format",
"expires": "in Milliseconds from epoch",
"scope": ["Privilege-1", "Privilege-2"].

7. The method of claim 6 further comprising the application authentication process including formatting the appToken to include the following attributes:
"iss": "App Admin Entity ID",
"token:issueTime": "Issued time in milliseconds",
"exp": "Expires time in milliseconds",
"token:type": "urn:cablelabs:1.0:jwt:token-type:appToken",
"token:subject": "App ID, that the App also knows",
"1.0::privileges": ["Privilege-1", "Privilege-2"].

8. The method of claim 6 further comprising the application authentication process including formatting the appToken to include the following attributes:

SAMLResponse=value&SigAlg=value&Signature=value.

9. The method of claim 6 further comprising the userToken being issued to the application as part of a user authentication process conducted with an identity provider (IdP).

10. The method of claim 9 further comprising the user authentication process including formatting the userToken to in include the following attributes:
"iss": "IdP Entity ID",
"token:issueTime": "Issued time in milliseconds from Jan. 1, 1970 0:00 hrs in UTC",
"exp": "Expires time in milliseconds from Jan. 1, 1970 00:00 hrs in UTC",
"token:type": "app:1.0:token-type:userToken",
"token:subject": "Subject NameID that the IdP wants to send to this SP,
"token:subject-format": "Transient OR Persistent,
"attribute:authz:channelID": "Channel ID",
"attribute:authz:maxMPAA": "maximum MPAA rating for this user",
"attribute:authz:maxVCHIP": "maximum VCHIP rating for this user.

11. The method of claim 6 further comprising issuing an error code if either one of the appToken and userToken is unverified.

12. The method of claim 11 further comprising issuing the error code to be at least one of invalid_token, expired_token, expired_user_token, expired_app_token, insufficient_scope, not_authorized.

13. A system for of authorizing an application to access services comprising:
an application administrator configured to issue an appToken for the application;
an identify provider (IdP) configure to issue a userToken for a user of the application; and
a service provider configured to provide access to the services in the event both of the appToken and the userToken are verified;
wherein the appToken includes the following attributes:
"iss": "App Admin Entity ID",
"token:issueTime": "Issued time in milliseconds",
"exp": "Expires time in milliseconds",
"token:type": "urn:cablelabs: 1.0:jwt:token-type:appToken",
"token:subject": "App ID, that the App also knows",
"1.0::privileges": ["Privilege-1", "Privilege-2"].

14. A system for of authorizing an application to access services comprising:
an application administrator configured to issue an appToken for the application;
an identify provider (IdP) configure to issue a userToken for a user of the application; and
a service provider configured to provide access to the services in the event both of the appToken and the userToken are verified; and
userToken includes the following attributes:
"iss": "IdP Entity ID",
"token:issueTime": "Issued time in milliseconds from Jan. 1, 1970 0:00 hrs in UTC",
"exp": "Expires time in milliseconds from Jan. 1, 1970 00:00 hrs in UTC",
"token:type": "app:1.0:token-type:userToken", "token:subject": "Subject NameID that the IdP wants to send to this SP,
"token:subject-format": "Transient OR Persistent,
"attribute:authz:channelID": "Channel ID",
"attribute:authz:maxMPAA": "maximum MPAA rating for this user",
"attribute:authz:maxVCHIP": "maximum VCHIP rating for this user.

\* \* \* \* \*